US008466857B2

(12) United States Patent
Yamaguchi

(10) Patent No.: US 8,466,857 B2
(45) Date of Patent: Jun. 18, 2013

(54) IMAGE DISPLAY APPARATUS FOR ADJUSTING LUMINANCE OF A DISPLAY BASED ON REMAINING BATTERY LEVEL AND ESTIMATED POWER CONSUMPTION

(75) Inventor: Takeshi Yamaguchi, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 13/356,584

(22) Filed: Jan. 23, 2012

(65) Prior Publication Data

US 2012/0120127 A1 May 17, 2012

Related U.S. Application Data

(62) Division of application No. 12/051,771, filed on Mar. 19, 2008, now abandoned.

(30) Foreign Application Priority Data

Mar. 29, 2007 (JP) ................................. 2007-087304

(51) Int. Cl.
*G09G 3/30* (2006.01)
*G09G 5/00* (2006.01)
*G09G 5/10* (2006.01)
*G06F 3/038* (2006.01)

(52) U.S. Cl.
USPC .............. 345/77; 345/211; 345/212; 345/690

(58) Field of Classification Search
USPC ............... 345/87-88, 204-215, 690-699, 77; 713/300-340; 323/285-287; 313/169.3
See application file for complete search history.

(56) References Cited

U.S. PATENT DOCUMENTS 5,894,580 A * 4/1999 Yoshida ........................ 713/340
6,724,356 B1 * 4/2004 Kojima et al. ................ 345/211
7,907,155 B2 * 3/2011 Shiomi ......................... 345/690
2007/0126672 A1 * 6/2007 Tada et al. ....................... 345/77
2007/0188429 A1 * 8/2007 Yamaguchi et al. ............ 345/88

* cited by examiner

*Primary Examiner* — Bipin Shalwala
*Assistant Examiner* — Ryan A Lubit
(74) *Attorney, Agent, or Firm* — Duane Morris LLP

(57) ABSTRACT

An image display apparatus includes a display having a plurality of light emitting elements. The image display apparatus also includes a controller configured to control displaying an image on the display, wherein the controller is operable to calculate an amount of light output by the plurality of light emitting elements and adjust a luminance level of the display based on the calculated amount of light output.

15 Claims, 4 Drawing Sheets

| REMAINING BATTERY LEVEL | POWER CONSUMPTION | LUMINANCE |
|---|---|---|
| 50 - 100% | 40 - 100% | 75% |
| | 0 - 40% | 100% |
| 25 - 50% | 40 - 100% | 50% |
| | 20 - 40% | 75% |
| | 0 - 20% | 100% |
| 0 - 25% | 40 - 100% | 25% |
| | 20 - 40% | 50% |
| | 0 - 20% | 75% |

| REMAINING BATTERY LEVEL | POWER CONSUMPTION | LUMINANCE |
|---|---|---|
| 50 - 100% | 40 - 100% | 75% |
| | 0 - 40% | 100% |
| 25 - 50% | 40 - 100% | 50% |
| | 20 - 40% | 75% |
| | 0 - 20% | 100% |
| 0 - 25% | 40 - 100% | 25% |
| | 20 - 40% | 50% |
| | 0 - 20% | 75% |

| FIG. 4A | FIG. 4B |
|---|---|

IMAGE DISPLAY APPARATUS FOR ADJUSTING LUMINANCE OF A DISPLAY BASED ON REMAINING BATTERY LEVEL AND ESTIMATED POWER CONSUMPTION

CROSS REFERENCE TO RELATED APPLICATION

This application is a divisional of U.S. patent application Ser. No. 12/051,771 filed Mar. 19, 2008 which claims foreign priority to Japanese Patent application No. 2007-087304 filed on Mar. 29, 2007. The contents of these applications are incorporated herein by reference in their entirety.

BACKGROUND OF THE INVENTION

1. Field of the Invention

The present invention relates to an image display apparatus used for electronic equipment including a display device having a plurality of light emitting elements, and relates to a driving method of the image display apparatus.

2. Description of the Related Art

Liquid crystal displays (LCDs) are commonly used as display devices in electronic equipment such as laptop computer and mobile phones.

Recently, organic electro-luminescent (EL) displays (organic light emitting diode (OLED) displays) have attracted attention as display devices capable of replacing LCDs.

OLED displays are self-light emitting display devices, like cathode ray tube (CRT) displays or plasma displays. In OLED displays, an anode electrode including indium tin oxide (ITO) is formed on a glass substrate, and an organic layer including a hole transport layer, a light emitting layer, and an electron transport layer, and a cathode electrode including a metal electrode are formed on the anode electrode.

Since OLED displays are self-light emitting devices, they consume power by emitting light. Power consumption is very low when black is displayed, and power consumption is maximum when white is displayed. Further, higher luminance display consumes a larger amount of power, and low luminance display only requires a small amount of power.

There is also a demand for reducing the size of portable terminals. Thus, the size of batteries is also reduced, and it is desirable that the portable terminals be operated for a long time by using a small amount of power. Therefore, there is a need to control power consumption.

Techniques for controlling power consumption of a display in a portable terminal are disclosed in, for example, Japanese Unexamined Patent Application Publication Nos. 2005-117172 and 2002-123208.

Japanese Unexamined Patent Application Publication No. 2005-117172 discloses an electronic apparatus configured to detect a remaining battery level and to control a luminance of a display when it is determined that the remaining battery level is low.

Japanese Unexamined Patent Application Publication No. 2002-123208 discloses an image display apparatus capable of changing a luminance and power consumption of a display and capable of adjusting the luminance and power consumption according to environmental conditions such as ambient brightness, a remaining battery level, content to be displayed, etc.

However, the technique disclosed in Japanese Unexamined Patent Application Publication No. 2005-117172 is an LCD technique, which has the following drawback. If the remaining battery level is low, luminance control is performed regardless of the type of images to be displayed on the display. Therefore, even dark images when displayed under low power consumption mode, may be displayed at a reduced luminance, which makes them hard to view.

In the technique disclosed in Japanese Unexamined Patent Application Publication No. 2002-123208, it is not specifically mentioned how to adjust the power consumption and luminance according to what type of content to be displayed on the display.

Therefore, there is a need to provide an image display apparatus and method that allows power consumption to be reduced while maintaining high image visibility.

BRIEF SUMMARY OF THE INVENTION

The invention addresses the above and other needs by disclosing an image display apparatus, and a driving method, which allows power consumption to be reduced while keeping high image visibility.

According to one embodiment of the invention, an image display apparatus includes a display having a plurality of light emitting elements. The image display apparatus also includes a controller configured to control displaying an image on the display. The controller calculates an amount of light output by the light emitting elements to adjust a luminance of the display according to the light output level.

According to another embodiment of the invention, an image display apparatus includes a display having a plurality of light emitting elements. The image apparatus also includes a controller configured to control displaying an image on the display and to adjust a luminance of the display according to an estimated power consumption level of the display. The controller estimates the power consumption level based on a light output level of the light emitting elements in the display.

According to a further embodiment of the invention, a method of driving an image display apparatus having a plurality of light emitting elements, includes: calculating a light output level of the light emitting elements based on image data corresponding to an image to be displayed on the display. The driving method further includes determining, according to the calculated light output level, whether a luminance of the display should be adjusted and by how much the luminance of the display should be adjusted, and then adjusting the luminance of the display based on the determination.

According to a further embodiment of the invention, a method of driving an image display apparatus includes: estimating a power consumption level of a display based on an amount of light output by a plurality of light emitting elements; determining, according to the estimated power consumption level, whether a luminance of the display should be adjusted and by how much the luminance should be adjusted; and adjusting the luminance of the display based on the determination.

DESCRIPTION OF THE PREFERRED EMBODIMENTS

Hereinafter, exemplary embodiments according to the present invention are described in detail below with reference to the appended figures. It should be understood that the figures are not necessarily drawn to scale and merely show exemplary features of the invention for the purpose of providing an enabling description of various embodiments of the invention. Therefore, the figures along with their associated text do not necessarily limit the scope of the invention as set forth by the claims provided herein.

Figure 1:
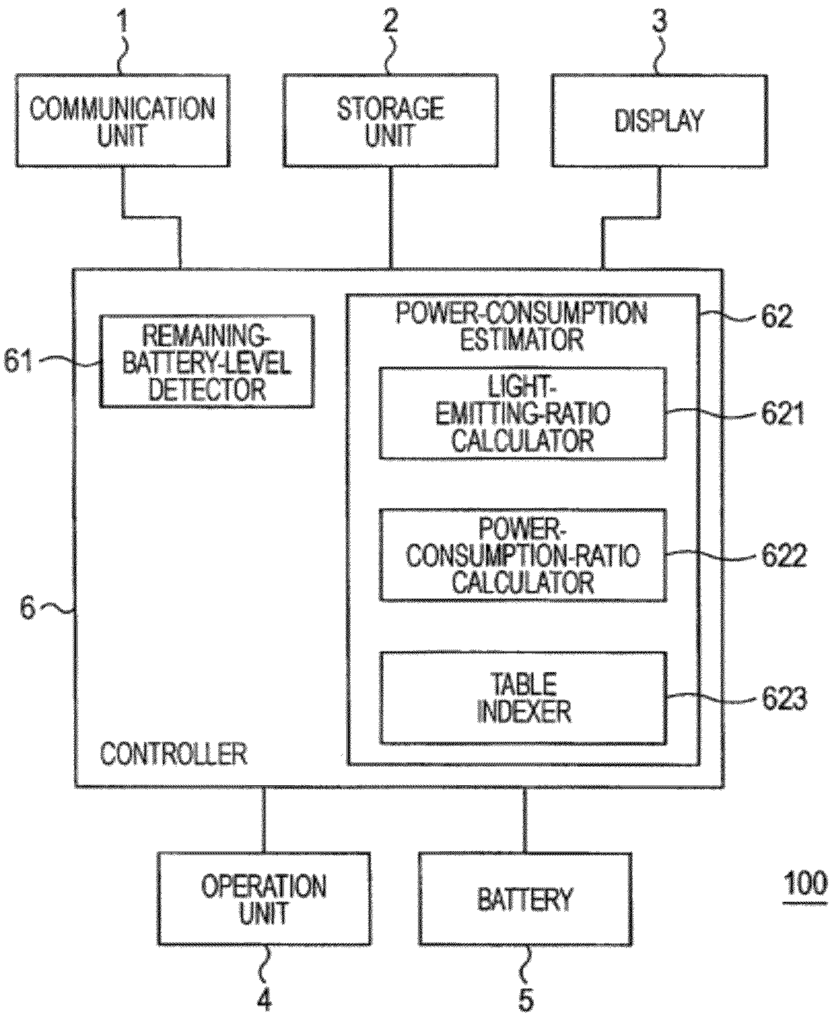
FIG. 1 is a block diagram showing an example structure of a portable terminal, in accordance with one embodiment of the invention.

FIG. 1 shows an example structure of a portable terminal 100. As shown in FIG. 1, the portable terminal 100 includes a communication unit 1, a storage unit 2, a display 3, an operation unit 4, a battery 5 and a controller 6.

The communication unit 1 transmits and receives various data via a communication network (not shown). Examples of the various data may include audio data for voice calling, text data for e-mail transmission and reception, image data for an attached file to e-mail, web page data for Internet browsing, music data and/or video data. The processing of these types of data is controlled by the controller 6 described below. As described below, the controller 6 generates an image to be displayed on a display 3 on the basis of these types of data.

A storage unit 2 stores various data used for performing the operations of the portable terminal 100. Examples of the various data may include the data received by the communication unit 1 via the communication network, other data necessary for performing processing of the portable terminal 100, programs such as applications, and operations of the portable terminal 100.

The storage unit 2 also stores a color-based power-consumption-ratio definition table defining a power consumption ratio for each color of emitted light and an illumination-level-based power-consumption-ratio table providing a power consumption ratio for each illumination level, which are referred to by a power-consumption estimator 62 described below. In one embodiment, these tables are stored in the storage unit 2 before the shipment of the portable terminal 100 from a factory.

In one embodiment, the display 3 includes an OLED display, which displays an image that is processed by the portable terminal 100, as described below.

In one embodiment, the display 3 can display images such as a voice call screen (for providing information concerning a calling party, a call time, etc.), an e-mail editor and viewer, a web pages browser, and a standby screen.

The display 3 can further display images (e.g., video, graphics and/or text) at a luminance determined by the controller 6.

One embodiment of an OLED display is briefly described.

Figures 2, 3:
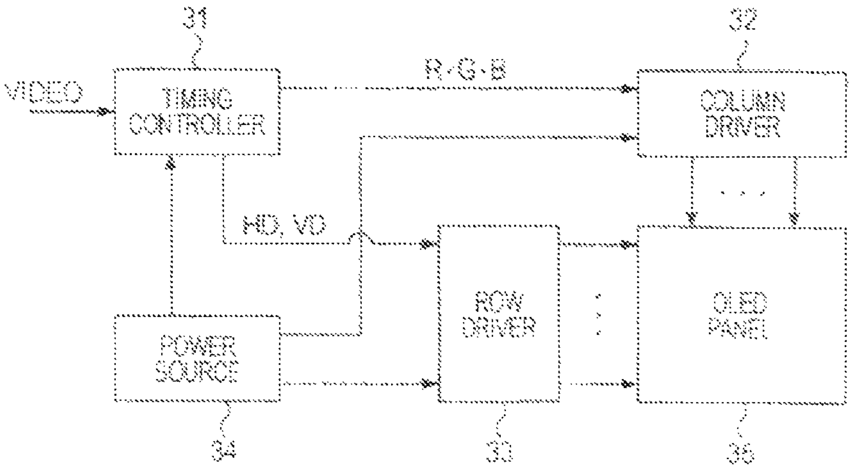
FIG. 2 is a diagram showing an example of a structure of an OLED display, in accordance with one embodiment of the invention.
FIG. 3 is a table showing an exemplary relationship between remaining battery levels, estimated power consumption levels, and luminance of a display screen, in accordance with one embodiment of the invention.

FIG. 2 shows an exemplary structure of an OLED display.

The OLED display includes a plurality of sets of light emitting elements arranged in longitudinal and lateral directions. Each of the sets can emit light of at least three colors. In this embodiment, the three colors are red (R), green (G), and blue (B). The drive of the light emitting elements is controlled through the controller 6 to display various images. As shown in FIG. 2, the OLED display includes a timing controller 31, a column driver 32, a row driver 33, a power source 34, and an OLED panel 35.

A video signal (VIDEO) output from the controller 6 is separated into RGB signals, a vertical synchronization signal (VD), and a horizontal synchronization signal (HD) by the timing controller 31. The RGB signals are held in analog latches by the column driver 32, and then the RGB signals are output, as voltage values, to each of column electrodes (data electrodes) of the OLED panel 35 in parallel at a specified time. The output signals are converted from voltage values to current values to drive the column electrodes by constant currents. Thus, data to be displayed as an image is updated at predetermined intervals.

The vertical synchronization signal VD and the horizontal synchronization signal HD are converted into predetermined voltage values by the row driver 33. Based on the voltage values, it is determined whether pixels selected by the column driver 32 are turned on or off. For example, in one embodiment, the OLED panel 35 may be an active matrix driving system, having rows of m pixels arranged in the lateral direction and columns of n pixels arranged in the longitudinal direction, wherein each pixel has one light emitting element. In this case, the OLED panel 35 typically has m column electrodes and n row electrodes. The n row electrodes are scanned sequentially from the first row electrode to the n-th row electrode. The pixels where the n row electrodes are scanned are set to an operation state by the constant current signals driven through the column electrodes for only a certain operating time. Accordingly, the row electrodes are sequentially scanned from the first row electrode to the bottom or n-th row electrode to refresh addresses of one screen. A single screen image generated by a scan pulse train for the first to n-th rows is referred to as a “frame”, and the scanning of the screen is repeatedly performed to consecutively display images.

An operation unit 4 includes an operation device having a ten-key pad, buttons, and switches, and receives user’s input operations to the portable terminal 100.

A battery 5 is a storage battery such as a lithium ion secondary battery. Typically the battery 5 is charged when the portable terminal 100 is not used. The battery 5 also may be charged when the portable terminal 100 is used. A remaining battery level of the battery 5 is detected by a remaining-battery-level detector 61 described below.

The controller 6 controls the overall operation of the portable terminal 100. That is, the controller 6 controls each of the components of the portable terminal 100 to perform an operation associated therewith. The controller 6 includes the remaining-battery-level detector 61 and the power-consumption estimator 62. The remaining-battery-level detector 61 detects a remaining battery level of the battery 5. It should be understood that any known technique can be used for a specific method of detecting the remaining battery level in one embodiment of the present invention.

In one embodiment, the remaining-battery-level detector 61 represents the detected remaining battery level of the battery 5 in terms of a ratio (percentage) with respect to a full charge level.

The power-consumption estimator 62 estimates a power consumption required for displaying an image on the display 3 on the basis of image data corresponding to the image displayed on the display 3.

In one embodiment, the power-consumption estimator 62 estimates the power consumption required for displaying an image on the display 3 on the basis of a calculated light output level, which indicates an amount of light output by the light emitting elements in the display 3 designated to emit light. In one embodiment, the light output level may be determined by determining a light emitting ratio of the display 3. The light emitting ratio of the display 3 represents a ratio of light emitting elements designated to emit light versus all the light emitting elements of the display 3. In other words, the light emitting ratio of the display 3 indicates what percentage of all the pixels is to emit light. The power-consumption estimator 62 estimates a power consumption of the display 3 on the basis of the light emitting ratio.

In one embodiment, the power-consumption estimator 62 includes a light-emitting-ratio calculator 621, a power-consumption-ratio calculator 622, and a table indexer 623 in order to estimates the power consumption.

The light-emitting-ratio calculator 621 scans the image data corresponding to an image to be displayed in order to count the number of light emitting elements to emit light. It is preferable that the number of light emitting elements be counted for each color of the light emitting elements. In this embodiment, the number of light emitting elements is counted for the red, green, and blue color of light emitting elements in the display 3. The light-emitting-ratio calculator 621 supplies the counted results to the power-consumption-ratio calculator 622.

The power-consumption-ratio calculator 622 multiplies the counted number of light emitting elements for each of colors through the light-emitting-ratio calculator 621 by a default value obtained by referring to the color-based power-consumption-ratio definition table stored in advance in the storage unit 2, thereby obtaining a power consumption ratio for each of red, green, and blue colors of the display 3 and an overall power consumption ratio of the display 3. The power-consumption-ratio calculator 622 supplies the results to the table indexer 623.

In one embodiment, the power-consumption-ratio calculator 622 calculates a power consumption ratio on the basis of not only the number of light emitting elements to emit light, but a gradation level of light to be emitted from each of the light emitting elements. For example, gradations of 0 to 255 are assigned to the light emitting elements. In this case, when the number of light emitting elements to emit light is counted, gradation values for each of the light emitting elements are also obtained and a sum of the gradation values is calculated. The sum of the gradation values is then divided by the counted number of light emitting elements. Thus, a power consumption of each of the light emitting elements to emit light can be determined in more detail on the basis of average gradation information concerning the light emitting elements, which is obtained by dividing the sum of the gradation values for the light emitting elements by the number of counted light emitting elements. In other words, an average gradation level of the counted light emitting elements is determined. The ratio of counted vs. total light emitting elements is then multiplied by the average gradation level of the counted light emitting elements to provide a more precise approximation of a light output level and, hence, the power consumption of the display device. Thus, a more precise approximation can take into account varying illumination levels and lighting conditions such as a dark images with dim lighting levels and light images with bright lighting levels.

The table indexer 623 indexes the illumination-level-based power-consumption-ratio table stored in advance in the storage unit 2 on the basis of the power consumption ratio of the overall display screen, which is determined by the power-consumption-ratio calculator 622. Thereafter, the table indexer 623 obtains an estimated power consumption level from the illumination-level-based power-consumption-ratio table. The estimated power consumption level may be defined in advance in accordance with a level of illumination.

In one embodiment, the power-consumption estimator 62 may perform the above-described power consumption estimation operation at predetermined intervals of time. The predetermined time intervals may be stored in the storage unit 2. Specifically, the display 3 updates an image displayed thereon at intervals of a predetermined period, and bitmap data specifying a color to be displayed at each of the pixels on the basis of an image to be displayed is generated by the controller 6 at intervals of the update period. The controller 6 determines which light emitting elements emit light. The controller 6 also determines gradation data for each of the light emitting elements. On the determinations by the controller 6, the power-consumption estimator 62 performs estimation of power-consumption at intervals of the predetermined period, as described above.

In one embodiment, the power-consumption estimator 62 represents the power consumption of the display 3 per predetermined time interval in terms of a ratio (percentage) with respect to a maximum power consumption (e.g., the power consumption per predetermined time interval, which is obtained when white is displayed on the entire display 3).

The controller 6 determines a luminance of the display 3 on the basis of the remaining battery level detected by the remaining-battery-level detector 61 and the estimated power consumption level of the display 3, which is estimated by the power-consumption estimator 62.

FIG. 3 shows an exemplary relationship table that defines the relationships between remaining battery level, estimated power consumption level, and luminance of a display screen displayed on the display 3, in accordance with one embodiment of the invention. The luminance may be expressed as a ratio (percentage) relative to a designated luminance (e.g., a luminance of a display screen displayed without any luminance control by the controller 6, which is determined by a user's designation or the like). As used herein, the term "designated luminance" may refer to default luminance level set by a user, manufacturer or other entity, or a maximum luminance level of a display device, and may be a constant value. As shown in FIG. 3, a luminance of a display screen to be displayed can be uniquely determined on the basis of a remaining battery level and estimated power consumption level. The values shown in FIG. 3, including threshold values (such as remaining battery levels of 50% and 25%, and power consumptions of 40% and 20%) and luminances (such as 75%, 50%, and 25%) of the display screen, are merely examples and may be modified. Those values may be arbitrarily determined by a user or may be set in advance before the shipment of the portable terminal 100.

Figures 4, 4A:
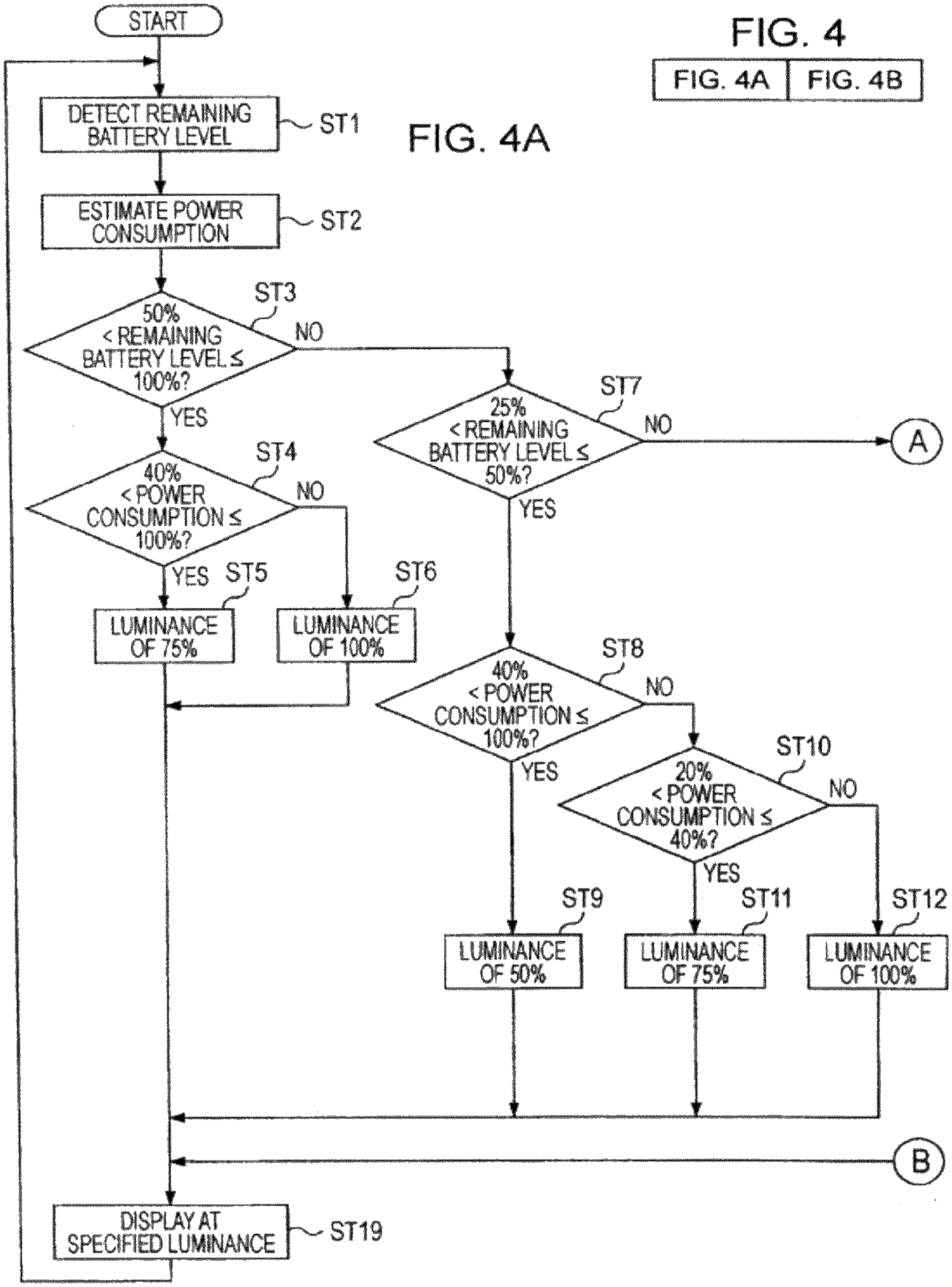
FIGS. 4A and 4B provide a flowchart of a process of adjusting the luminance of a display apparatus based on a determined remaining battery level and power consumption level of the display apparatus, in accordance with one embodiment of the invention.
Figure 4B:
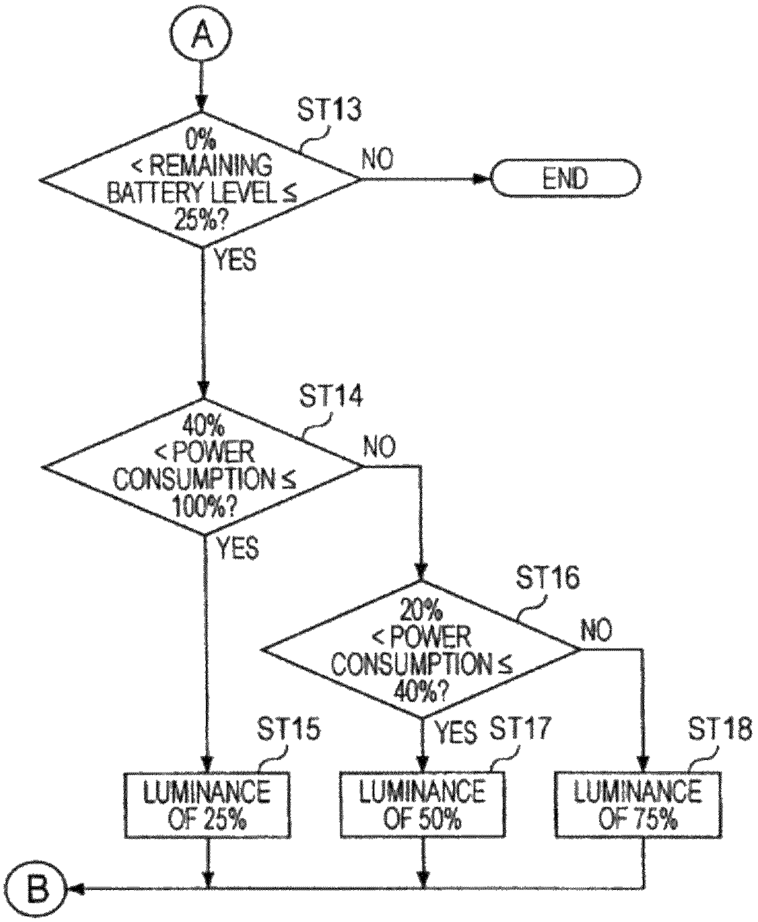

FIG. 4, which includes FIGS. 4A and 4B, provides a flowchart of a process of adjusting the luminance of a display apparatus, in accordance with one embodiment of the invention.

The flowchart shown in FIG. 4 may start when an image is displayed on the display 3 when the portable terminal 100 is powered on. As discussed above, the controller 6 determines a luminance of a display screen on the display 3 according to the relationship shown in FIG. 3.

In step ST1, the remaining-battery-level detector 61 detects a remaining battery level of the battery 5.

In step ST2, the power-consumption estimator 62 acquires image data and estimates the power consumption required for displaying the image on the display 3.

The processing of steps ST1 and ST2 described above may be performed in reverse order. That is, in step ST1, the power-consumption estimator 62 may estimate the power consumption required for displaying an image on the display 3. Then, in step ST2, the remaining-battery-level detector 61 may detect a remaining battery level of the battery 5. Alternatively, the process shown in FIG. 4 may be started when a predetermined amount of change occurs in the remaining battery level or when a predetermined level of power consumption occurs.

In step ST3, the controller 6 determines whether or not the remaining battery level of the battery 5 detected in step ST1 is greater than 50% and less than or equal to 100%. If so, the process proceeds to step ST4; otherwise, the process proceeds to step ST7.

In step ST4, the controller 6 determines whether or not the power consumption is greater than 40% and is less than or equal to 100% on the basis of the estimated power consumption level of the display 3 obtained in step ST2. If so, the process proceeds to step ST5; otherwise, the process proceeds to step ST6.

In step ST5, the controller 6 determines the luminance of the display screen displayed on the display 3 to be 75% of the designated luminance.

In step ST6, the controller 6 determines the luminance of the display screen displayed on the display 3 to be equal to the designated luminance (100%).

In step ST7, the controller 6 determines whether or not the remaining battery level of the battery 5 detected in step ST1 is greater than 25% and less than or equal to 50%. If so, the process proceeds to step ST8; otherwise, the process proceeds to step ST13.

In step ST8, the controller 6 determines whether or not the power consumption is greater than 40% and less than or equal to 100% on the basis of the estimated power consumption level of the display 3 obtained in step ST2. If so, the process proceeds to step ST9; otherwise, the process proceeds to step ST10.

In step ST9, the controller 6 determines the luminance of the display screen displayed on the display 3 to be 50% of the designated luminance.

In step ST10, the controller 6 determines whether or not the power consumption is greater than 20% and is less than or equal to 40% on the basis of the estimated power consumption level of the display 3 obtained in step ST2. If so, the process proceeds to step ST11; otherwise, the process proceeds to step ST12.

In step ST11, the controller 6 determines the luminance of the display screen displayed on the display 3 to be 75% of the designated luminance.

In step ST12, the controller 6 determines the luminance of the display screen displayed on the display 3 to be equal to the designated luminance (100%).

In step ST13, the controller 6 determines whether or not the remaining battery level of the battery 5 detected in step ST1 is greater than 0% and is less than or equal to 25%. If so, the process proceeds to step ST14; otherwise, the process ends because the battery 5 is out of power. A remaining battery level of 0% is used by way of example. In actuality, however, the display 3 and the controller 6 can be out of operation before the remaining battery level becomes 0%. Thus, a value other than 0% at which these components are out of operation may be used.

In step ST14, the controller 6 determines whether or not the power consumption is greater than 40% and is less than or equal to 100% on the basis of the estimated power consumption level of the display 3 obtained in step ST2. If so, the process proceeds to step ST15; otherwise, the process proceeds to step ST16.

In step ST15, the controller 6 determines the luminance of the display screen displayed on the display 3 to be 25% of the designated luminance.

In step ST16, the controller 6 determines whether or not the power consumption is greater than 20% and is less than or equal to 40% on the basis of the estimated power consumption level of the display 3 obtained in step ST2. If so, the process proceeds to step ST17; otherwise, the process proceeds to step ST18.

In step ST17, the controller 6 determines the luminance of the display screen displayed on the display 3 to be 50% of the designated luminance.

In step ST18, the controller 6 determines the luminance of the display screen displayed on the display 3 to be 75% of the designated luminance.

In step ST19, the display 3 displays an image at the luminance determined by the controller 6. Then, the process returns to step ST1.

Afterwards, the processing of steps ST1 to ST19 is repeated, for example, each time a predetermined time elapses or each time an image displayed on the display 3 is changed.

As described above, according to the portable terminal 100 of the embodiment, the power-consumption estimator 62 estimates a power consumption of the display 3 on the basis of a determined light output level, which may include a light emitting ratio and/or gradation information in order to obtain an estimated power consumption level. If the power consumption is large, the controller 6 sets the display luminance of the display 3 lower than the designated luminance, compared with when the power consumption is small. This can reduce the power consumption required for providing a display on the display 3, resulting in a longer lasting display even when there is limited battery capacity.

Furthermore, in one embodiment, the remaining-battery-level detector 61 detects a remaining battery level of the battery 5. If the remaining battery level is low, the controller 6 lowers the display luminance of the display 3, compared with when the remaining battery level is high. This can reduce the power consumption required for providing a display on the display 3, resulting in longer lasting display even when there is limited battery capacity.

Moreover, with the above-described structure, the time of high-luminance display on the display 3 can be reduced, resulting in the longer lifetime of the display 3. Further, since displaying at a lowered luminance may be performed at appropriate times, a load on the display elements can be reduced and screen burn-in of the display 3 can be reduced.

While, in the foregoing embodiment, the display 3 has been described in the context of an OLED display by way of example, the present invention is not limited to this embodiment. The present invention is applicable to any display device having a plurality of light emitting elements. Examples of display devices having a plurality of light emitting elements, other than an OLED display, include a plasma display, for example. Thus, the present invention is also applicable to a plasma display and other similar types of displays.

While various embodiments of the present invention have been described above, it should be understood that they have been presented by way of example only, and not of limitation. Likewise, the above figure may depict exemplary configurations for the invention, which is done to aid in understanding the features and functionality that can be included in the invention. The invention is not restricted to the illustrated architectures or configurations, but can be implemented using a variety of alternative architectures or configurations. Additionally, although the invention is described above in terms of various exemplary embodiments and implementations, it should be understood that the various features and functionality described one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What it claimed is:

1. A portable communication terminal, comprising:

a communication unit for transmitting and receiving data via a communications network;

a storage unit for storing the data and computer executable instructions for performing operations of the portable communication terminal;

an operations unit configured to receive a user's input to perform one or more operations of the portable communications terminal;

a battery for supplying power to portable communications terminal;

a display for displaying images; and a controller configured to display images on the display and to adjust a luminance level of the display based on an estimated power consumption value and a remaining level of the battery, wherein the controller is further configured to:

determine whether a remaining battery level of the battery falls within one of a first battery level range or a second battery level range, wherein the first battery level range is higher than the second battery level range;

determine whether an estimated power consumption value falls within one of a first power consumption range or a second power consumption range, wherein the first power consumption range is higher than the second power consumption range;

when the remaining battery level is determined to fall within the first battery level range and the estimated power consumption value is determined to fall within the first power consumption range, the controller adjusts the luminance level to a first luminance level;

when the remaining battery level is determined to fall within the first battery level range and the estimated power consumption value is determined to fall within the second power consumption range, the controller adjusts the luminance level to a second luminance level;

when the remaining battery level is determined to fall within the second battery level range and the estimated power consumption value is determined to fall within the first power consumption range, the controller adjusts the luminance level to a third luminance level, and when the remaining battery level is determined to fall within the second battery level range and the estimated power consumption value is determined to fall within the second power consumption range, the controller adjusts the luminance level to a fourth luminance level, wherein the first luminance level is lower than the second luminance level and the third luminance level is lower than the fourth luminance level.

2. The portable communications terminal of claim 1 wherein the display comprises a plurality of light emitting elements and the controller estimates the power consumption value based at least in part on a light output level of the plurality of light emitting elements.

3. The portable communications terminal of claim 2 wherein the controller estimates the light output level of the plurality of light emitting elements based on image data corresponding to an image to be displayed.

4. The portable communications terminal of claim 2 wherein the controller calculates a gradation level of light for each of the plurality of light emitting elements and thereafter calculates a sum of gradation levels to estimate the light output level.

5. The portable communications terminal of claim 4, wherein the light output level is further calculated by calculating a light emitting ratio of the display and the light output level is calculated based on both the light emitting ratio and the sum of gradation levels.

6. The portable communications terminal of claim 1 wherein the controller further comprises a memory storing a table that the first and second battery level ranges, the first and second power consumption ranges and the first, second, third and fourth luminance levels.

7. The portable communications terminal of claim 1 wherein the first, second, third and fourth luminance levels are set to 50%, 75%. 25% and 50%, respectively, of a peak luminance level.

8. The portable communication terminal according to claim 1, wherein the first battery level range is set to 25-50% of a peak battery level and the second battery level range is set to 0-25% of the peak battery level.

9. The portable communication terminal according to claim 1, wherein the first power consumption range is set to 40-100% of a peak power consumption level and the second power consumption range is set to 20-40% of the peak power consumption level.

10. The portable communication terminal according to claim 1, wherein the controller is further configured to:

determine whether the estimated power consumption value falls within a third power consumption range, wherein the third power consumption range is lower than the first and second power consumption ranges;

when the remaining battery level is determined to fall within the first battery level range and the estimated power consumption value is determined to fall within the third power consumption range, the controller adjusts the luminance level to a fifth luminance level; and when the remaining battery level is determined to fall within the second battery level range and the estimated power consumption value is determined to fall within the third power consumption range, the controller adjusts the luminance level to a sixth luminance level, wherein the fifth luminance level is higher than the first and second luminance levels and the sixth luminance level is higher than the third and fourth luminance levels.

11. The portable communication terminal according to claim 10, wherein the first, second and third power consumption ranges are 40-100%, 20-40% and 0-20%, respectively, of a peak power consumption value.

12. The portable communication terminal according to claim 10, wherein the first and second battery level ranges are 25-50% and 0-25%, respectively, of a peak battery level.

13. The portable communication terminal according to claim 10, wherein the controller is father configured to:

determine whether the remaining battery level of the battery falls within a third battery level range, wherein the third battery level range is higher than the first and second battery level ranges;

when the remaining battery level is determined to fall within the third battery level range, determine whether an estimated power consumption value falls within the first power consumption range or a fourth power consumption range, wherein the first power consumption range is higher than the fourth power consumption range;

when the remaining battery level is determined to fall within the third battery level range and the estimated power consumption value is determined to fall within the first power consumption range, the controller adjusts the luminance level to a seventh luminance level;

when the remaining battery level is determined to fall within the third battery level range and the estimated power consumption value is determined to fall within the fourth power consumption range, the controller adjusts the luminance level to an eighth luminance level, wherein the seventh luminance level is lower than the eighth luminance level.

14. The portable communication terminal according to claim 13, wherein the first, second, third and fourth power consumption ranges are 40-100%, 20-40%, 0-20% and 0-40%, respectively, of a peak power consumption value, wherein the fourth power consumption range is only used when the remaining battery level is determined to fall within the third battery level range.

15. The portable communication terminal according to claim 13, wherein the first, second and third battery level ranges are 25-50%, 0-25% and 50-100%, respectively, of a peak battery level.

* * * * *